Inventors
Ralph H. Nelson and
William G. Nostrand

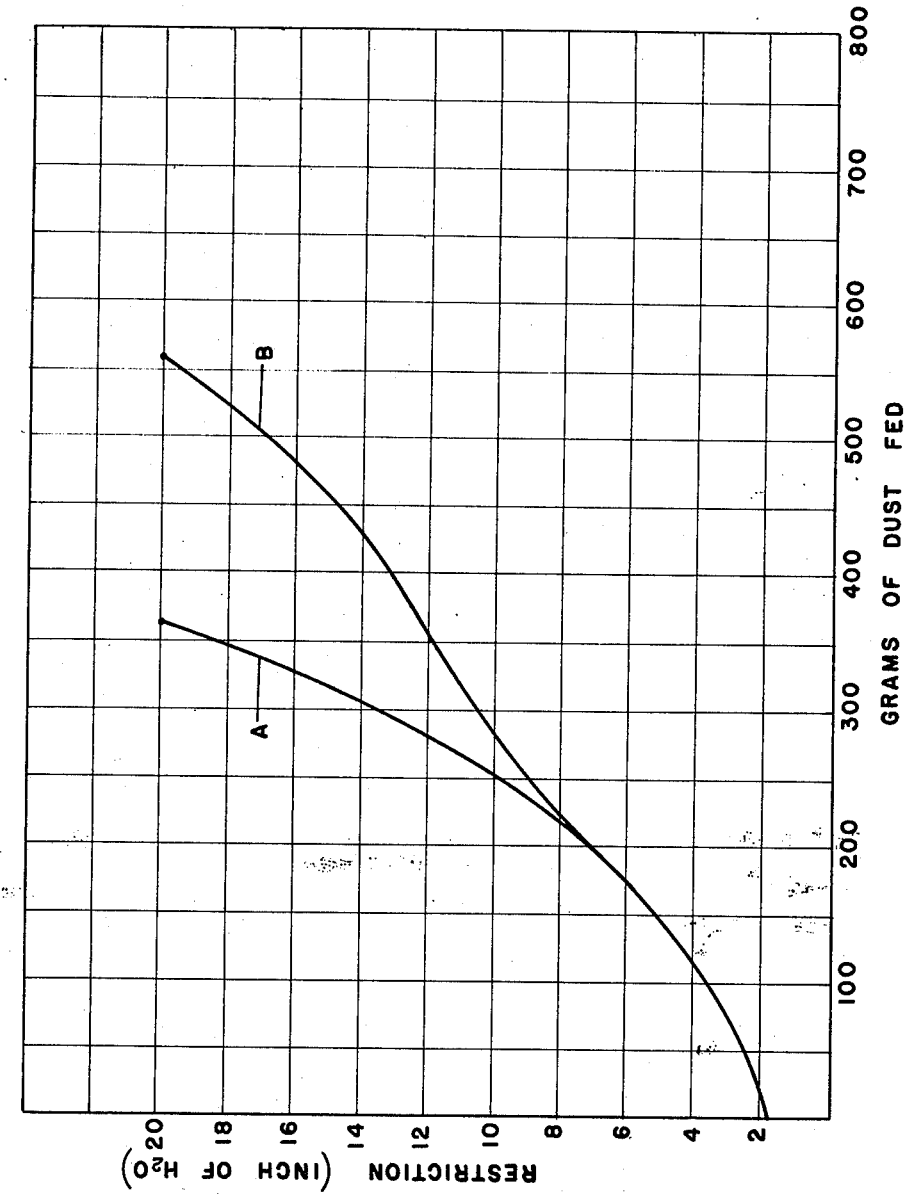

United States Patent Office 3,494,114
Patented Feb. 10, 1970

3,494,114
AIR FILTER WITH SECONDARY SAFETY FILTERING ELEMENT
Ralph H. Nelson and William G. Nostrand, Stoughton, Wis., assignors to Nefco Filter Corporation, Stoughton, Wis., a corporation of Wisconsin
Filed Dec. 14, 1967, Ser. No. 690,531
Int. Cl. B01d 46/12
U.S. Cl. 55—482                                    2 Claims

ABSTRACT OF THE DISCLOSURE

In an air filter having separate working and safety filter elements through which air to be filtered normally passes in series, a restricted passageway permits the bypassing of the working element of a small proportion of the air to increase the dirt-holding capacity of the working element.

BACKGROUND OF THE INVENTION

One type of air filter designed for heavy duty service as, for example, an air cleaner for tractor engine intake, is provided with two separate filtering elements through which the air passes in series. Generally, the elements are in the form of spaced, concentric cylinders. The dirt-laden air passes inwardly into the filter apparatus, first through the outer element and then through the inner element, usually, but not necessarily, the inner element comprises a filtering media of somewhat less restriction than that of the outer element. The inner element, frequently termed the "safety filter," is not intended to remove dirt from the air in the normal operation of the filter apparatus, but is intended to be left in place while the outer or working filter element is removed and replaced when loaded with dirt. The safety element prevents damage to the engine or other apparatus to which the cleaned air passes from the filter unit that might, but for the presence of the safety element, be caused by the carrying of particles or pieces of solid material, such as a broken-off piece of the working filter element, to the engine or other apparatus.

The working filter element is intended to remove and hold particles entrained in the air flowing into the filter unit. Proper maintenance requires that the working element be replaced when it becomes loaded with dirt to the point at which restriction to the flow of air therethrough reaches a maximum permissible limit. It is desirable, of course, to minimize the frequency of performance of this chore. For a given size of filter unit and application, the time intervals between working filter element replacements may be increased only by increasing the dirt-holding capacity of this element.

It is, accordingly, an object of this invention to provide an air filter of the dual element safety type wherein the useful life of the working filter element is substanitally lengthened by increasing the dirt-holding capacity of this element of the filter unit.

SUMMARY OF THE INVENTION

The foregoing object is achieved by providing a limited passageway around the working filter element whereby a controlled proportionate part of the air entering the filter unit is permitted to bypass the working element and flow directly to and through the safety filter element. This is accomplished very simply by providing small apertures at appropriate locations in walls of the filter apparatus. It has been found that by this simple means, the dirt-holding capacity of the working filter element is increased to a surprising etxent and the time intervals between necessary replacements of the working filter element are correspondingly increased.

DESCRIPTION OF THE DRAWING

In the accompanying drawing,
FIG. 2 is a graph showing the comparative capacities of working filter elements of a filter unit which does, and a filter unit which does not, embody the invention.

DESCRIPTION OF PREFERRED EMBODIMENT

Figure 1:
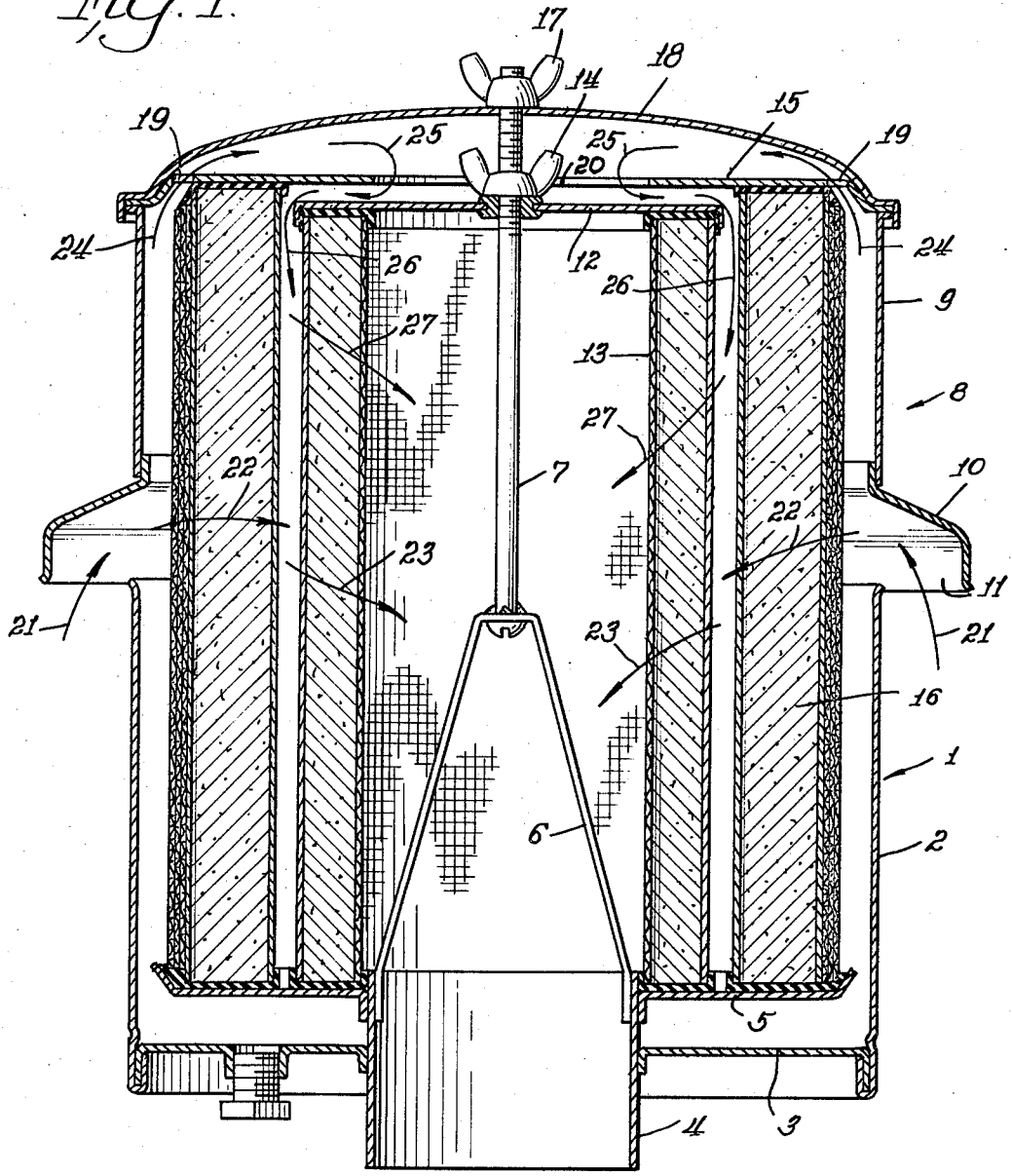
FIG. 1 is a cross-sectional view of an air cleaner embodying the invention.

As an important application of the invention, the improved air filter is shown and described herein by way of example as an air cleaner for the intakes of tractor engines. The housing and supporting structure of the air cleaner comprise a shroud assembly 1 including a cylindrical wall 2, bottom wall 3, snout 4 for connection with the intake of the engine, an annular tray 5 for supporting the filter elements, and a yoke 6 to which is permanently fastened an upwardly extending bolt 7. Shroud cover 8 includes a cylindrical wall 9 and an annular hood 10 which provides an annular intake opening 11 for ingress of dirty air into the filter unit.

Inner retainer plate 12 engages the upper end of safety filter element 13 and clamps the element in place against tray 5 when wing nut 14 is tightened upon bolt 7. A second retainer plate 15, spaced above plate 12, engages the top of working filter element 16 and clamps this element downwardly into position against tray 5 when wing nut 17 is tightened upon bolt 7 against cover 18.

Since the construction of the filtering elements, themselves, forms no part of the invention and different types of elements and filtering media may be employed, these elements will not be shown or described in detail. The filter elements for tractor intake cleaners usually imply accordion-folded paper contained between wraps of hardware cloth or similar supporting and protecting material.

In accordance with the invention, provision is made for the bypassing of a small part of the air directly to the inner, safety filter element 13. Apertures 19 of controlled size and number are provided in plate 15 outwardly of the top of working filter element 16 so that a limited amount of air may pass through apertures into the space under cover 18. Plate 15 also has a large central aperture 20 through which bolt 7 extends and through which air may pass from the space under cover 18 downwardly into the apparatus.

In operation, dirty air flows into the filter unit as indicated by arrows 21. The major portion of the air flows through the working filter element 16, as indicated by arrows 22, then through safety filter element 13, as indicated by arrows 23, and thence downwardly through outlet snout 4.

A small portion of the dirty air flows through apertures 19, as indicated by arrows 24, thence downwardly through aperture 20, as indicated by arrows 25, then downwardly between the two filtering elements, as indicated by arrows 26, and finally through the safety filter element 13, as indicated by arrows 27, and then down through outlet snout 4.

The volume of air flowing through apertures 19, and thus bypassing the working filter element 16, is only a very small proportionate part of the total volume of air flowing through the filtering unit. The volume of this bypassed flow is controlled by the number and size of apertures 19 which may be distributed around circumference of plate 15. While this bypassed air is unfiltered and, therefore, carries some dirt with it, the amount is so small that only an insignificant amount of dirt is deposited upon the safety filter 13 by the bypassed air.

Almost all of the dirt is caught and held by the working filter element 16. It has been found, however, that for a given size of filter unit and air conditions, the dirt-holding capacity and, therefore, the useful life of the working filter element is very greatly increased by reason of the bypassing of only a very small part of the air. While the reason for this surprising result is not known with certainty, it is thought that the diminished velocity of the air flowing through the media of the working filter element results in its ability to retain the larger amount of dirt before it becomes restricted to the point that it must be replaced.

In a carefully controlled laboratory test, it was found that the dirt-holding capacity of the primary element of a conventional filter unit (without provision for the portional bypassing of the working element) was increased from 0.22 gram per square inch of paper filtering media to 0.28 gram per square inch by providing limited bypassing of the working filter element as above described. In the filter unit tested, the total open area of the bypass control apertures was approximately one percent of the area of the paper filtering media of the working filter element. These proportions indicate the order of magnitude of the proportion of air bypassed around the working filter element in the employment of the invention. Excessive bypassing flow would place an undue filtering burden upon the safety element, while inadequate provision for bypass flow would result in less than optimum improvement in the dirt-holding capacity of the working filter element.

These results are indicated in the overall filter unit operation shown graphically in FIG. 2. Curve A shows the increase in restriction offered to the flow of dust-laden air supplied to the filter unit as the working filter element became loaded to a cut-off pressure drop across the unit of 20 inches of water; 360 grams of dust was retained by filter unit. Curve B shows the result of a test of a filter unit which embodies the invention as above described. Provision was made for a limited bypass flow around the working filter element; 560 grams of dust was retained by the filter unit when the cut-off restriction of 20 inches of water was reached. Thus, the dirt-holding capacity of the filter unit was increased by more than 50% when the unit was constructed in accordance with the invention.

With the bypassing of a small part of the dirty air directly to the safety filter element, a small amount of dirt is, of course, deposited upon this element so that it must be replaced occasionally. Experience has shown that the safety element should be replaced with about every fifth replacement of the working element, but this is a small price to pay for the very substantial saving of time and working filter element replacement costs which result from the increased load of dirt which the working filter element is capable of taking on by virtue of the use of the inventive expedient.

What is claimed is:

1. In an air filter unit of the safety type including separate cylindrical working and safety filtering elements arranged in coaxial spaced nested relation to each other with the working elements surrounding the safety element, means forming a restricted passageway around said working filter element for the bypassing of a small proportion of the unfiltered air directly to said safety filtering element, said means comprising a first plate covering and closing the top of the safety element, a second plate spaced above said first plate and covering the top of the working element, said second plate having an opening in the central portion and at least one small aperture in the peripheral portion thereof providing said restricted passageway, said aperture being open to the inlet of the air filter unit.

2. Structure in accordance with claim 1 wherein the filtering media of the working filter element comprises a sheet of filter paper and the total area of the one or more apertures is about one percent of the filtering area of the filter paper.

References Cited

UNITED STATES PATENTS

| | | | |
|---|---|---|---|
| 1,756,758 | 4/1930 | Orem | 55—484 |
| 2,050,581 | 8/1936 | Orem | 55—485 |
| 3,012,631 | 12/1961 | Kaser | 55—323 |
| 3,173,775 | 3/1965 | Hampton et al. | 55—259 |
| 3,186,391 | 6/1965 | Kennedy | 55—510 |
| 3,272,336 | 9/1966 | Humbert | 210—132 |
| 3,293,830 | 12/1966 | McKinlay | 55—510 |
| 3,385,038 | 5/1968 | Davis | 55—510 |
| 3,387,435 | 6/1968 | Broad | 55—503 |

HARRY B. THORNTON, Primary Examiner

BERNARD NOZICK, Assistant Examiner

U.S. Cl. X.R.

55—498, 510